United States Patent [19]

Roth

[11] Patent Number: 4,628,793

[45] Date of Patent: Dec. 16, 1986

[54] PNEUMATIC POSITION CONTROLLER

[75] Inventor: Günther Roth, Solingen, Fed. Rep. of Germany

[73] Assignee: Sunvic Reglar GmbH, Solingen, Fed. Rep. of Germany

[21] Appl. No.: 639,223

[22] Filed: Aug. 9, 1984

[30] Foreign Application Priority Data

Aug. 19, 1983 [DE] Fed. Rep. of Germany ....... 3329944

[51] Int. Cl.$^4$ ............................................. F15B 13/16
[52] U.S. Cl. ........................................ 91/374; 91/387; 137/85
[58] Field of Search .......................... 91/387, 374, 385; 137/84, 85

[56] References Cited

U.S. PATENT DOCUMENTS

| | | | |
|---|---|---|---|
| 2,940,699 | 6/1960 | Plummer | 91/363 A |
| 3,468,221 | 9/1969 | Johnson | 91/387 |
| 4,263,838 | 4/1981 | Laurent, Jr. | 91/387 |
| 4,343,224 | 8/1982 | Kemmler | 91/387 |

FOREIGN PATENT DOCUMENTS 731081 4/1980 U.S.S.R. ............................. 91/387

Primary Examiner—Edward K. Look
Assistant Examiner—Mark A. Williamson
Attorney, Agent, or Firm—Marshall, O'Toole, Gerstein, Murray & Bicknell

[57] ABSTRACT

In a pneumatic position controller for controlling the position of a pneumatic servomotor (10) to a value determined by a pneumatic command pressure, the command pressure acts through a movable wall member (30) on a pivotable balancing member (40). The balancing member (40) controls through a baffle plate (52) the outlet nozzle (56) of a pneumatic amplifier (24). The balancing member (40) is axially spaced from a feedback lever (44), with aligned pivot axes. A helical torsion spring (50) has one end attached to the balancing member (40) and the other end attached to the feedback lever (44). The feedback lever (44) is rotatable by the servomotor (10). An advantageous and compact construction permitted by the use of the helical torsion spring (50) is described.

12 Claims, 8 Drawing Figures

PNEUMATIC POSITION CONTROLLER

The invention relates to a pneumatic position controller for controlling the position of a pneumatic servomotor to a value determined by a pneumatic command pressure, wherein (a) the command pressure acts through a movable wall member on a pivotably arranged balancing member which controls an outlet nozzle of a pneumatic amplifier, (b) the output of the pneumatic amplifier is applied to the servomotor, (c) a feedback lever is arranged to be rotated about an axis by the servomotor, and (d) a spring arranged to be tensioned by torsion about said axis acts between the balancing member and the feedback lever.

The pneumatic servomotor may, for example, comprise a diaphragm exposed to a command pressure, which diaphragm makes a stroke against the action of a loading spring and actuates a valve through a valve spindle. The command pressure can be the output pressure of a pneumatic controller by which a flow rate or a mixture is controlled. With such a "diaphragm valve drive" the position of the valve cone ought to be determined unambiguously by the balance between command pressure and spring force. Due to packing friction and similar influences, however, there is no such unambiguous relation. The pneumatic servomotor moves stepwise and with hysteresis. This can result in undesirable hunting.

Therefore it is known with such pneumatic servomotors to provide a feedback which ensures continuously accurate relation between the position of the pneumatic servomotor and the pneumatic command pressure. A position controller with closed control loop is provided by which the position of the servomotor is always controlled to a value determined by the pneumatic command pressure.

With prior art position controllers of this type for diaphragm valve drives a feedback lever is connected with the valve spindle through a connecting rod. The command pressure acts through a movable wall member such as a bellows on a pivotable balancing member. The balancing member is a lever which is connected with a baffle plate. The baffle plate cooperates with an outlet nozzle. The outlet nozzle is connected through a conduit with the diaphragm chamber of the diaphragm valve drive. This conduit is exposed to a supply pressure through a restrictor. A tension spring is tensioned between the feedback lever and the balancing member. The command pressure urges the baffle plate against the outlet nozzle, whereby the pressure acting on the diaphragm of the diaphragm valve is increased. Thereby the diaphragm is moved with the valve spindle against the action of the spring. The feedback lever coupled with the valve spindle tensions the tension spring, whereby the spring tension counteracts the command pressure acting on the movable wall member. The pressure acting on the diaphragm is increased such that a state of balance between the command pressure and the tension of the tension spring ensues. Then the valve spindle adopts a position which depends on the command pressure only and is not affected by additional forces acting on the valve spindle such as packing friction.

In order to provide a space-saving arrangement, a pneumatic position controller has already been provided (German patent publication No. 28 47 380), wherein a feedback lever is rotatable about an axis by a servomotor, and a spring adapted to be tensioned by torsion about this said axis acts between the balancing member and the feedback lever. This spring is a spiral spring, i.e. spring made of a spring steel strip and spirally wound in one plane, the inner end of said spiral spring being attached to the shaft of the feedback lever. The outer end of this spiral spring is bent-off radially outwardly and is connected with the movable wall member. The movable wall member is a diaphragm, which non-positively engages the baffle plate of a pneumatic amplifier through a rod which is attached to the diaphragm disc and connected to the end of the spiral spring. This baffle plate directly represents the pivotably arranged "balancing member" and governs the outlet nozzle of the pneumatic amplifier.

It is the object of the invention to simplify the design of a pneumatic position controller of the type defined in the beginning thereby reducing its costs.

According to the invention this object is achieved in that (e) the balancing member is axially spaced from the feedback lever with a pivot axis substantially aligned with the axis of the feedback lever, (f) the spring is a helical torsion spring one end of which is affixed to the balancing member and the other end of which is affixed to the feedback lever.

A helical torsion spring has a small diameter and is long. A spiral spring has a large diameter and is short. With a helical torsion spring the points of attack of the forces are located in the center and one behind the other. With a spiral spring the points of attack of the forces are located side by side, namely one in the center and the other one at the periphery. Thereby a helical torsion spring permits the shaft of the feedback lever extending into the housing to be arranged symmetrically in the middle of the wall of the housing. With a spiral spring this is not possible for geometrical reasons. Such a symmetric arrangement permits the position of the feedback lever to be the same, when the controller is built-in on the left side, as when it is built-in on the right side.

Space is available on both sides of the helical torsion spring. This space can, for example, be utilized to accommodate integrated manometers. Modifications of the invention are subject matter of the sub-claims.

An embodiment of the invention is described in greater detail hereinbelow with reference to the accompanying drawings.

Figure 1:
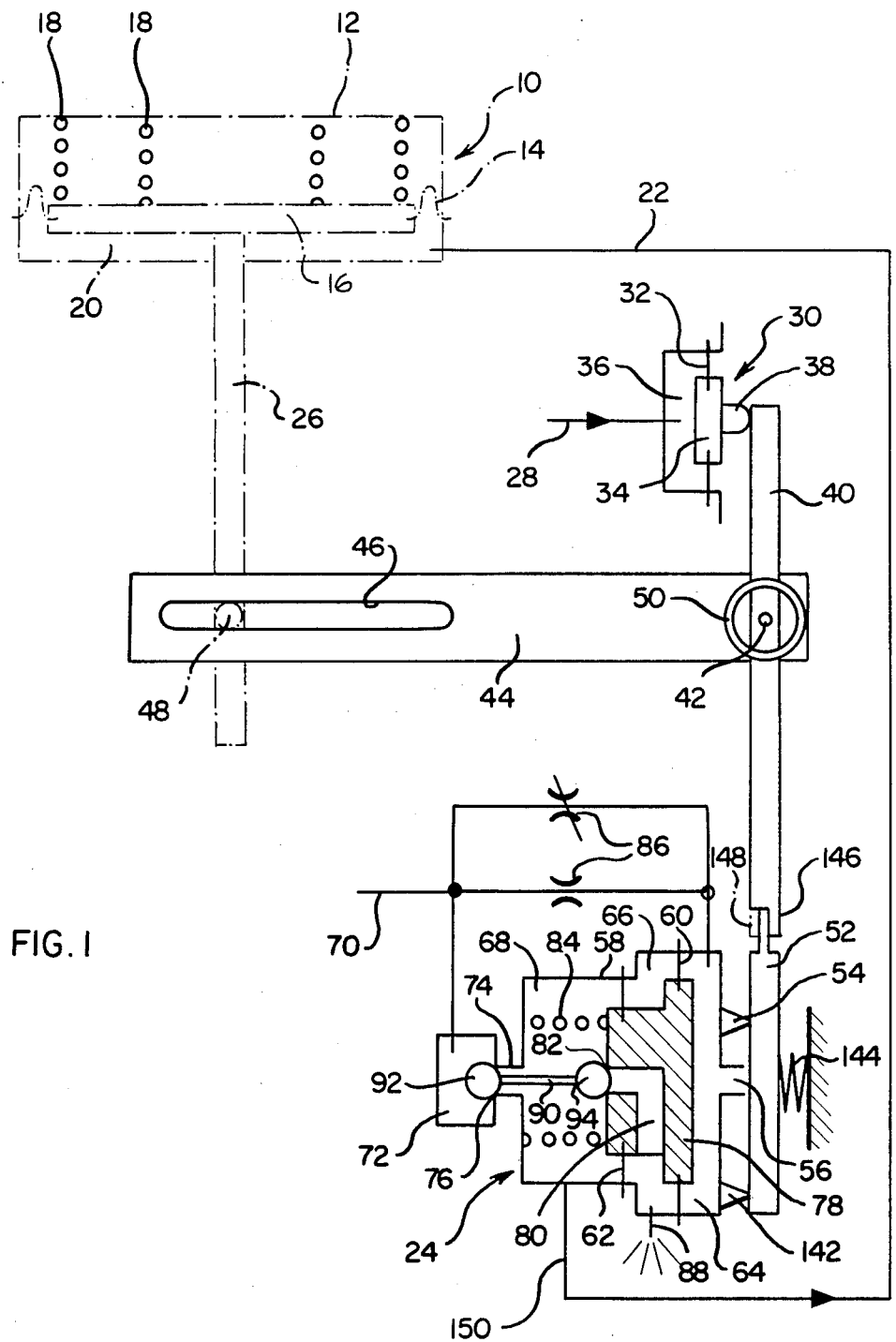
FIG. 1 is an illustration of the principle of a pneumatic position controller.

In the schematic illustration of FIG. 1 numeral 10 designates a pneumatic servomotor. The pneumatic servomotor comprises a diaphragm casing 12. A diaphragm 14 with a diaphragm disc 16 is clamped in the diaphragm casing 12. The diaphragm disc is loaded by springs 18. The diaphragm chamber 20 which is defined in the diaphragm casing 12 on the side of the diaphragm 14 remote from the springs 18 is exposed to the output pressure of a pneumatic amplifier 24 through a conduit 22. A spindle, for example a valve spindle 26, is attached to the diaphragm disc 16. When the diaphragm 14 is exposed to the output pressure of the amplifier 24 effective in the diaphragm chamber 20, the diaphragm 14 and the diaphragm disc 16 are moved to the top in FIG. 1 against the action of the springs 18, and correspondingly the valve spindle 26 is moved. The position of the valve spindle 26 is to be determined by a command pressure which is applied to an inlet 28. The command pressure acts on a movable wall member 30 in the form of a diaphragm 32 with a diaphragm disc 34, said movable wall member closing a command pressure chamber 36. The movable wall member 30 presses against a balancing member 40 through a thrust piece 38. Here the balancing member 40 is a two-armed lever, which is pivotably mounted about a pivot axis 42. A feedback lever 44 is pivotably mounted about an axis substantially aligned with the pivot axis 42 of the balancing member. In the schematic illustration, the feedback lever 44 has a longitudinal slot 46 which is engaged by a lateral pin 48 provided on the spindle 26. Thus with movement of the spindle 26, the feedback lever 44 will be rotated. A helical torsion spring 50 is arranged between the balancing member 40 and the feedback lever 44 axially spaced therefrom. One end of the helical torsion spring 50 is attached to the balancing member 40, and the other end of the helical torsion spring 50 is attached to the feedback lever 44.

The command pressure acts on one arm of the balancing member 40. A baffle plate 52 of the pneumatic amplifier is arranged to be rotated by the other arm of the balancing member 40. The baffle plate 52 rests on a baffle plate support 54 and is pivotable about this support. The baffle plate 52 governs an outlet nozzle 56. The amplifier 24 comprises a housing portion 58 which is subdivided by two parallel diaphragms 60 and 62 into a first chamber 64 located above (on the right in FIG. 1) one diaphragm 60, a second chamber 66 located between the diaphragms, and a third chamber located below (on the left in FIG. 1) the other diaphragm 62. The housing portion 58 of the amplifier 24 further defines an air inlet chamber 72 communicating with an air inlet port 70. This air inlet chamber 72 communicates with the third chamber through a valve passage 74 with a valve seat 76 on the side of the air inlet chamber. The two diaphragms 60 and 62 are interconnected by a connecting body 78. The connecting body 78 has a passage 80 therein connecting the second and third chambers 66 and 68, respectively. On the side of the third chamber 68 the passage 80 ends within a valve seat 82. The two diaphragms and the connecting body 78 are acted upon by a compression spring 84. The first chamber is connected with the air inlet port 70 through a restrictor 86, which preferably comprises a fixed and an adjustable passage, and to atmosphere through the outlet nozzle 56 governed by the baffle plate 52. The second chamber 66 is vented to atmosphere through an outlet 88. The third chamber 68 is connected with the servomotor 10 through the conduit 22. A valve member 90 having two interconnected valve closure bodies 92 and 94 is provided, of which one is arranged in the air inlet chamber 72 and cooperates with the valve seat on the side of the air inlet chamber, and the other one of which is arranged in the third chamber 68 and cooperates with the valve seat 82 on the connecting body 78. Starting from a central position in which both valve passages are closed, always either communication between the air inlet chamber 72 and the third chamber 68 is established or communication between the third chamber 68 and the second chamber 66 and thus with atmosphere.

The arrangement described operates as follows:

In a state of balance the tension of the helical torsion spring 50 balances, at the balancing member 40, the command pressure acting through the movable wall member 30. In the first chamber, a pressure has ensued which balances, apart from spring 84, the pressure in the third chamber 68. The valve passages 74 and 80 governed by the valve closure bodies 92 and 94 are closed. This condition corresponds to a particular position of the spindle 26 and of the feedback lever 44.

If the command pressure on the movable wall member 30 is increased, the balancing member 40 will be rotated slightly clockwise. This does not significantly affect, in practice, the tension of the torsion spring. The other arm of the balancing member 40 rotates the baffle plate 52 counter-clockwise about the baffle plate support 54. Thereby the outlet nozzle 56 is opened further. The pressure in the first chamber 64 drops. Correspondingly the diaphragms 60 and 62 with the connecting body 78 move to the right in FIG. 1. The valve member 90 cannot follow, as the valve closure body 92 seats on its valve seat 76, whereby the valve closure body 94 is lifted from its valve seat 82 and the passage 80 is opened. Thus the pressure in the third chamber 68 drops and thereby also the pressure in the diaphragm chamber 20 of the pneumatic servomotor 10. The diaphragm 14 with the diaphragm disc 16 and the spindle 26 moves downwardly in FIG. 1 under the action of the springs 18. Thereby the torsion spring 50 is tensioned further, such that the increased tension of the torsion spring 50 again balances, at the balancing member 40, the increased command pressure, and the amplifier 24 returns to its original state.

If the command pressure on the movable wall member 30 in decreased, the balancing member 40 will be rotated slightly counter-clockwise under the action of the helical torsion spring 50, the bias of which now overcomes the pressure in the command pressure chamber 36. The other arm of the balancing member 40 rotates the baffle plate 52 clockwise about the baffle plate support 54. Thereby the outlet nozzle is closed further. The pressure in the first chamber 64 increases. Correspondingly the diaphragms 60 and 62 with the connecting body 78 move to the left in FIG. 1. Thereby the valve closure body 96 is caused to seat on its valve seat 82 and to close the passage 80 to atmosphere. At the same time the valve member 90 is pushed to the left in FIG. 1, whereby the valve closure body 92 is lifted from its seat 76. This establishes communication from air inlet port 70 through air inlet chamber 72, valve passage 74, third chamber 68 and conduit 22 to the diaphragm chamber 20 of the pneumatic servomotor 10. The diaphragm 14 with the diaphragm disc 16 and the spindle 26 moves upwardly in FIG. 1 against the action of springs 18. Thereby the tension of torsion spring 50 is reduced by clockwise movement of feedback lever 44, such that the reduced tension of the torsion spring 50 again balances, at the balancing member 40, the reduced command pressure, and the amplifier 24 returns to its original state.

FIGS. 2 to 6 show the design of a pneumatic position controller operating in accordance with this principle.

Figure 2:
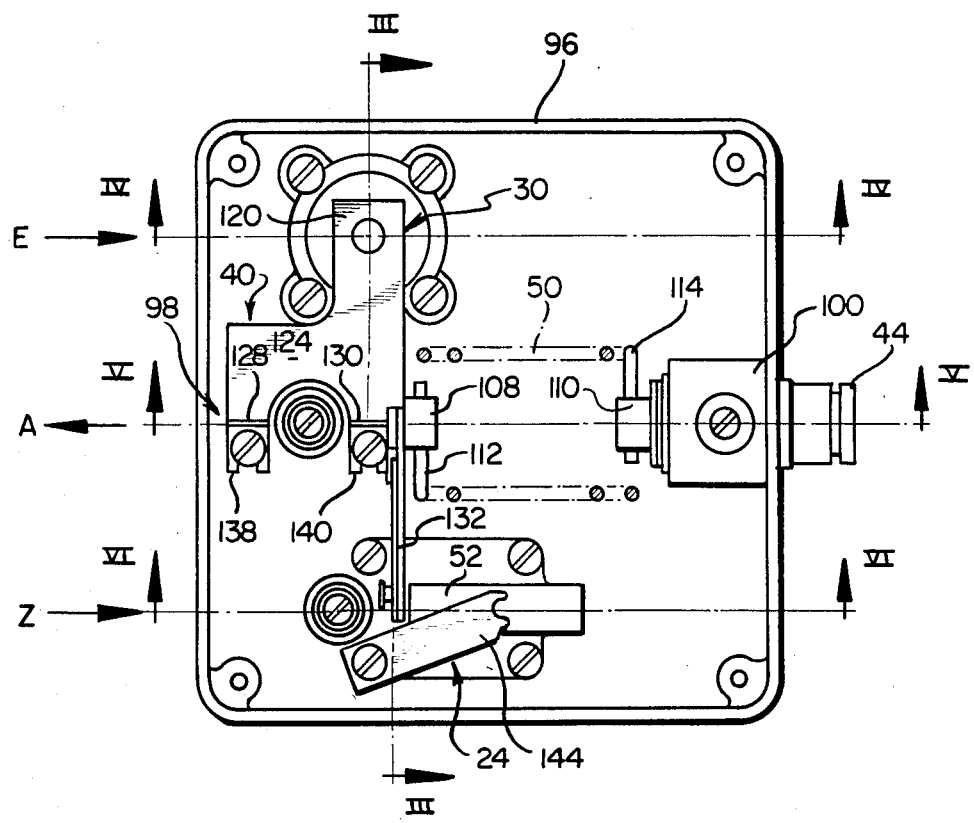
FIG. 2 shows a side elevation of the pneumatic position controller with the cover removed.
Figure 5:
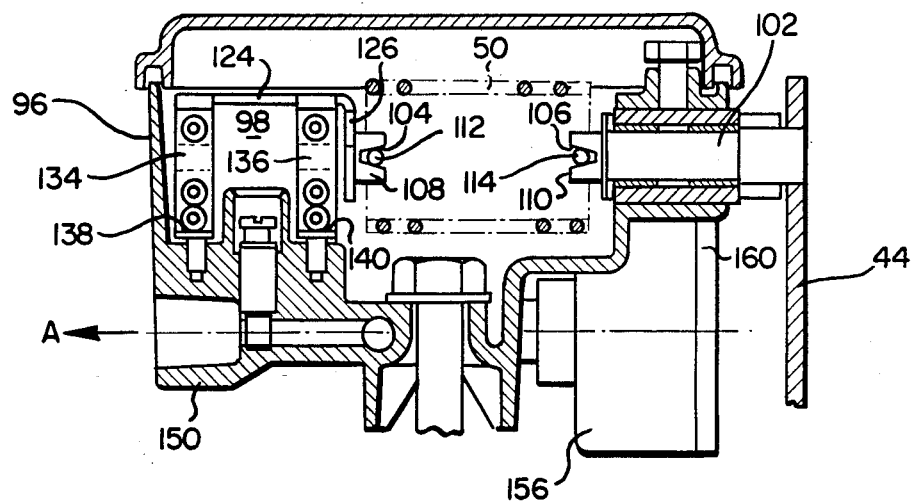
FIG. 5 is a sectional view taken along line V—V of FIG. 2.

The movable wall member 30, a bearing assembly 98 for the two-armed lever representing the balancing member, and the pneumatic amplifier 24 are arranged one above the other in a housing 96 of rectangular cross section, as viewed in elevational view (FIG. 2), in one half of this housing (on the left in FIG. 2). A bearing 100 for the feedback lever 44 rotatable by the servomotor is provided in alignment with the bearing assembly 98 on the opposite side. The two arms of the two-armed lever extend over the movable wall member 30 and the amplifier 24, respectively. The helical torsion spring 50 extends substantially along the center plane of the housing 96 between the two-armed lever (40) and a pivot 102 of the feedback lever 44. The torsion spring is affixed to the balancing member 40 and the feedback lever 44 in that aligned retainer pins 108 and 110 facing each other and having a transverse slot 104 and 106, respectively, each are provided on the balancing member 40 and the feedback lever 44, respectively, and the helical torsion spring 50 has diametrically extending ends 112 and 114, respectively, on its end faces, said ends 112 and 114 being held in the transverse slots 104 and 106, respectively (FIG. 5). The transverse slots 104 and 106 narrow towards their bottoms, whereby the ends 112 and 114 are wedged into the transverse slots under the action of the axial pre-tension of the torsion spring 50. Thereby the torsion spring is safely retained. On the other hand, the torsion spring 50 can easily be removed and exchanged by axially compressing the torsion spring.

Figure 3:
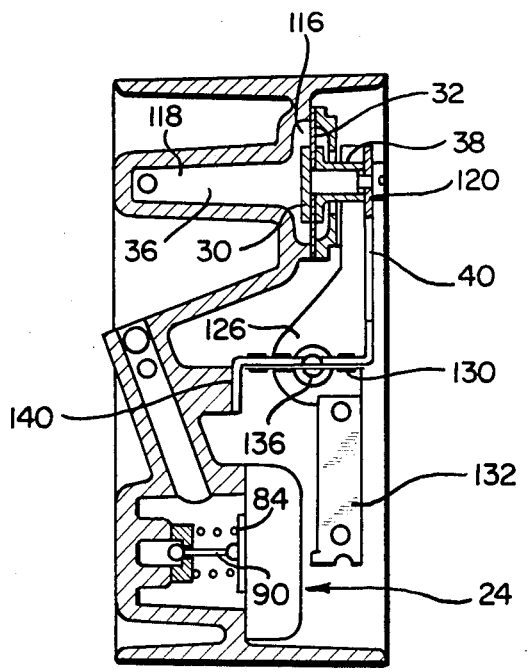
FIG. 3 is a sectional view taken along line III—III of FIG. 2.
Figure 4:
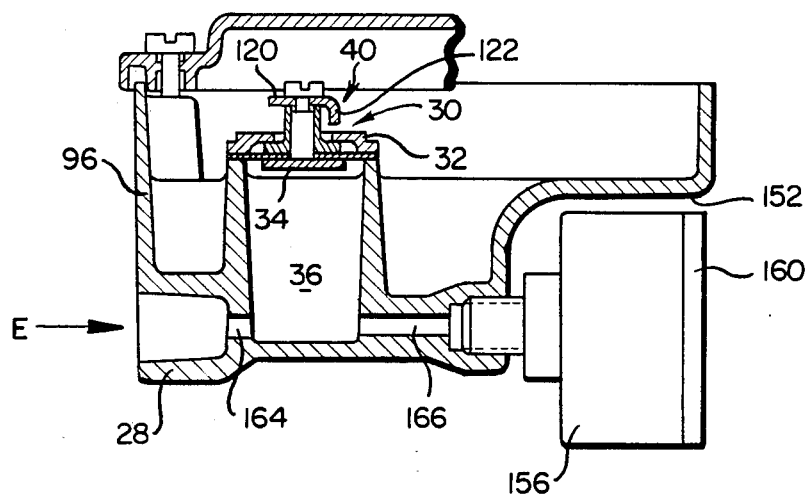
FIG. 4 is a sectional view taken along line IV—IV of FIG. 2.

As can be seen from FIGS. 3 and 4, the movable wall member 30 comprises a diaphragm 32 which closes a command pressure chamber 36 exposed to the command pressure. The diaphragm 32 exposed to the command pressure chamber comprises a portion 116 of circular cross section adjacent the diaphragm 32, and an adjacent portion 118 having elongated cross section and being narrower in the longitudinal direction of the two-armed lever (40). Thereby the volume of the command pressure chamber 36 is reduced.

The two-armed lever (40) is a structural body made, for example, of castmetal. The structural body has a first arm 120, which extends over the movable wall member 30 and is engaged by the movable wall member. As can be seen from FIG. 4, the arm is reinforced by a rectangularly bent-off rim 122. The structural body furthermore comprises a central portion 124, which is wider than the first arm 120. The central portion 124 has generally rectangular shape. It has a bent-off side cheek 126 (FIG. 5) and two bent-off brackets 128,130 opposite the first arm 120. Furthermore the structural body comprises a second arm 132 screwed to the side cheek 126 and extending in the direction opposite the first arm 120. The brackets 128 and 130 are connected to leaf springs 134 and 136, respectively, which are attached to the housing. The leaf springs 134 and 136 are attached to one leg each of respective L-shaped sheet metal parts 138 and 140, respectively, which are, in turn, secured by screws to a corresponding surface of the housing 96. The retainer pin 108 provided with a transverse slot 104 for the helical torsion spring 50 is provided on the side cheek 126. The second arm 132 engages the baffle plate 52 of the pneumatic amplifier 24.

Figure 6:
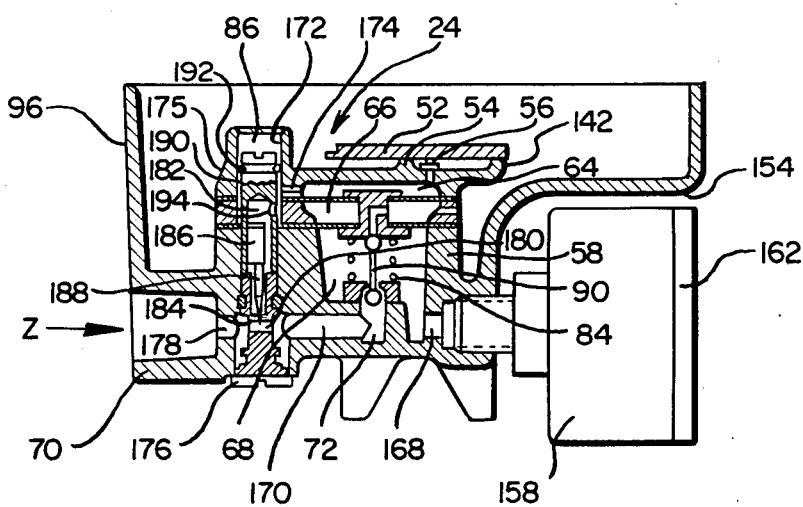
FIG. 6 is a sectional view taken along line VI—VI of FIG. 2.

The pneumatic amplifier 24 is constructed, in principle, like the amplifier illustrated schematically in FIG. 1 and described hereinbefore. Corresponding elements in FIG. 6 are designated by the same reference numerals as in FIG. 1.

Two baffle plate supports, namely the baffle plate support 54 and an additional baffle plate support 142 are provided on the housing portion 58 of the amplifier 24, the outlet nozzle 56 being located therebetween. The baffle plate 52 rests on the baffle plate supports 54 and 142 and is held resiliently in engagement with the baffle plate supports 54 and 142 by a spring resting centrally on the baffle plate 52. In the practical embodiment, the spring 144 is a leaf spring. Two dogs are provided on the second arm 132 of the two-armed lever, and are spaced and arranged on opposite sides of the baffle plate 52 and are adjustable relative to the baffle plate 52, whereby optionally one or the other dog becomes effective and engages the baffle plate 52 with one or the other direction of rotation of the two-armed lever and causes rotary movement of the baffle plate 52 against the action of the spring 144 about one or the other baffle plate support 54 or 142, respectively. In FIG. 1 this has been indicated by the dog 146 and the dog 148 shown in dashed lines.

Figure 7:
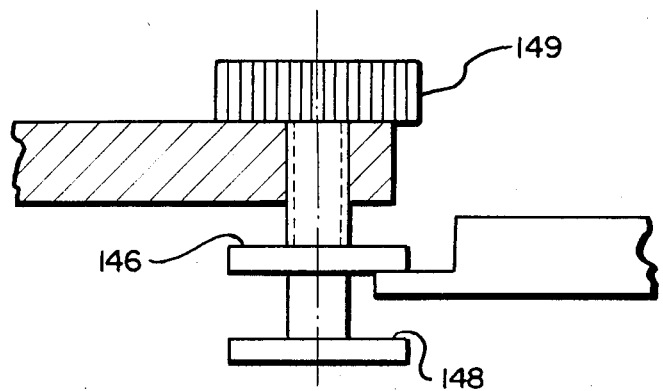
FIG. 7 is an enlarged illustration and shows the design of the point of engagement of the balancing member with the baffle plate.
Figure 8:
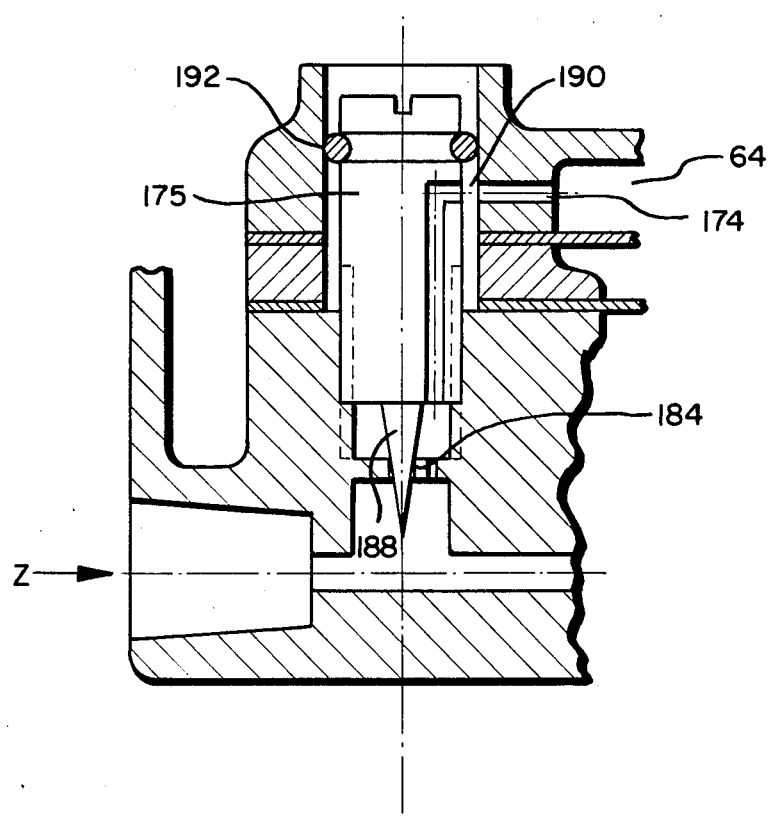
FIG. 8 is a simplified enlarged illustration and shows the inlet restrictor of the amplifier.

FIG. 7 shows the design of the point of engagement of the balancing member or arm 132 with the baffle plate 52. A screw 149 is screwed into the arm 132 and carries the two dogs 146 and 148. In the illustrated position of the screw 149 the dog 146 engages the upper surface of the baffle plate 52.

When the arm 132 is rotated clockwise, the baffle plate 52 will be rotated counter-clockwise. Counter-clockwise rotation of the arm 132 has no effect with the displacements occuring here, as the dog 148 is not moved into engagement with the baffle plate 52. When the direction of control is to be reversed, the screw 149 is screwed out so that the dog 148 engages the lower surface of the baffle plate. In this case the baffle plate 52 is rotated clockwise, when the arm 132 is rotated counter-clockwise. Clockwise rotation of the arm 132 has then no effect.

On that side of the housing 96 on which the movable wall member 30, the bearing assembly 98 and the amplifier 24 are arranged one above the other, a command pressure port 28, an output pressure port 150, which is connected to the conduit 22 (FIG. 1) and the air inlet port 70 are provided on the side of the housing 96 and one above the other. The housing 96 is recessed on the opposite side on both sides of the helical torsion spring 50 to form cavities 152 and 154.

Two manometers 156 and 158 are attached in the cavities 152 and 154, respectively (FIGS. 4 and 6), thus formed on the outside of the housing 96, the dials 160 and 162, respectively, of said manometers being arranged parallel to the plane of movement of the feedback lever 44 on opposite sides of the feedback lever 44. The command pressure chamber 36 closed by the movable wall member 30 communicates through aligned bores 164 and 166 (FIG. 4) with the command pressure port 28, on one hand, and one of the manometers 156, on the other hand. The third chamber 68 of the amplifier 24, in which the output pressure is generated, communicates with the other manometer 158 through a bore 168. Thus the command pressure and the output pressure resulting therefrom can be read on the manometers. The manometers are integrated with the housing 96 in compact manner. Their dials 160 and 162 are arranged on the same side as the feedback lever 44, so that the pressures and the position of the feedback lever 44 can be watched at the same time.

The air inlet port 70 communicates, through a bore 170 aligned therewith, with the air inlet chamber 72. This bore 170 is intersected by a transverse bore 172, which communicates with the first chamber 64 of the amplifier 24 through a narrow connecting bore 174. An adjustable restrictor assembly is arranged in the transverse bore 172 and includes the restrictor 86 between the air inlet port 70 and the first chamber 64.

The restrictor assembly comprises a body 175 of generally cylindrical shape located in the transverse bore 172. At one end the body 175 has a head 176 which closes the transverse bore 172. The body 174 is provided with a turned down portion in the area of the bore 170 between the air inlet port 70 and the air inlet chamber 72 to form an annular chamber 178 around the body 175 through which supply air from the air inlet port 70 can flow to the air inlet chamber 72. The body 175 has a transverse bore 180 aligned with the bore 170. In addition the body 175 defines a cavity 182 extending longitudinally in the body 175. The cavity 182 communicates with the transverse bore 180 through a narrow passage 184. A square 186, which carries a valve needle 188, is pressed into the cavity. The valve needle 188 together with the narrow passage 184 forms a variable restrictor. The body 175 has a reduced diameter section which together with the bore 172 defines an annular chamber 190. The annular chamber 190 is sealed towards the outside by an O-ring 192. The cavity 182 communicates with the annular chamber 190 through a lateral bore 194. Supply air flows through the passage 184, being throttled by the valve needle, past the square 186 through the cavity 182, the lateral bore 194, the annular chamber 190 and the connecting bore 174 into the first chamber 64.

I claim:

1. Pneumatic position controller for controlling the position of pneumatic servomotor (10) to a value determined by a pneumatic command pressure, wherein
   (a) the command pressure acts through a movable wall member (30) on a pivotably arranged balancing member (40) which controls an outlet nozzle (56) of a pneumatic amplifier through a baffle plate (52);
   (b) the output of the pneumatic amplifier (24) is applied to the servomotor (10);
   (c) a feedback lever (44) is arranged to be rotated about a pivot axis by the servomotor (10); and
   (d) a spring arranged to be tensioned by torsion about said feedback lever pivot axis acts between the balancing member (40) and the feedback lever (44) characterized in that
   (e) the balancing member (40) is axially spaced from the feedback lever (44) with a pivot axis substantially coextensively aligned with the pivot axis of the feedback lever (44);
   (f) the spring is a helical torsion spring (50) one end of which is affixed to the balancing member (40) and the other end of which is affixed to the feedback lever (44) to directly couple the helical spring torque tension from the feedback lever to the balancing member.

2. Pneumatic position controller as claimed in claim 1, characterized in that:
   (a) aligned retainer pins (108,110) facing each other and each having a transverse slot (104, 106) are provided on the balancing member (40) and the feedback lever (44); and
   (b) the helical torsion spring (50) has diametrically extending ends (112, 114) on their end faces, said ends being held in the transverse slots (104, 106) by the axial pre-tension of torsion spring (50).

3. Pneumatic position controller as claimed in claim 2, characterized in that the transverse slots (104,106) narrow towards their bottoms.

4. Pneumatic position controller as claimed in any one of the claims 1 to 3, characterized in that:
   (a) the movable wall member (30) exposed to the command pressure, a bearing assembly (98) for a two-armed lever representing the balancing member (40), and the pneumatic amplifier are arranged one above the other in a housing (96) of rectangular cross section, as viewed in elevation, in one half of said housing;
   (b) a bearing (100) for the feedback lever (44) rotatable by the servomotor (10) is provided in alignment with the bearing assembly (98) on the opposite side of the housing;
   (c) the two arms of the two-armed lever (40) extend over the movable wall member (30) and the amplifier (24), respectively;
   (d) the helical torsion spring (50) extends substantially along the center plane of the housing (96) between the two-armed lever (40) and a pivot (102) of the feedback lever (44).

5. Pneumatic position controller as claimed in claim 4, characterized in that the movable wall member (30) comprises a diaphragm (32) which closes a command pressure chamber (36) exposed to the command pressure.

6. Pneumatic position controller as claimed in claim 5, characterized in that
   (a) the diaphragm (32) exposed to the command pressure is circular, and
   (b) the command pressure chamber (36) comprises a portion (116) of circular cross section adjacent the diaphragm (32) and an adjacent portion (118) having elongated cross section and being narrower in the longitudinal direction of the two-armed lever (40).

7. Pneumatic position controller as claimed in claim 4, characterized in that:
   (a) the two-armed lever (40) is a structural body
      (a₁) which has a first arm (120) extending over the movable wall member (30) and engaged by the movable wall member (30), as well as
      (a₂) a central portion (124) wider than the first arm (120) and having a bent-off side cheek (126) and two bent-off brackets (128, 130) opposite the first arm (120), and
      (a₃) a second arm (132) extending in the plane of the side cheek (126) in the direction opposite the first arm (120),
   (b) the brackets (128, 130) are connected to leaf springs (134, 136) which are attached to the housing,
   (c) the retainer pin (108) having a transverse slot (104) for the helical torsion spring (50) is provided on the side cheek (126), and
   (d) the second arm (132) engages the baffle plate (52) of the pneumatic amplifier (24).

8. Pneumatic position controller as claimed in claim 7, characterized in that
   (a) the amplifier (24) has a housing portion (58) which is subdivided by two parallel diaphragms (60,62) into a first chamber (64) located above one diaphragm (60), a second chamber (66) located between the diaphragms (60,62) and a third chamber (68) located below the other diaphragm (62),
   (b) the housing portion (58) of the amplifier (24) further defines an air inlet chamber (72) communicating with an air inlet port (70), said air inlet chamber communicating with the third chamber (68) through a valve passage (74) provided with a valve seat (76) on the side of the air inlet chamber,
   (c) the two diaphragms (60,62) are interconnected by a connecting body (78) which has a passage therethrough interconnecting the second and third chambers (66 and 68, respectively), said passage opening within a valve seat (82) on the side of the third chamber (68),
   (d) the two diaphragms (60,62) are biased towards the first chamber (64) by a spring (84) arranged in the third chamber,
   (e) the first chamber (64) communicates with the air inlet port (70) through a restrictor (86) and with atmosphere through an outlet nozzle (56) governed by the baffle plate (52),
   (f) the second chamber (66) is vented to atmosphere,
   (g) the third chamber (68) is connected with the servomotor (10), and
   (h) a valve member (90) having two interconnected valve closure bodies (92,94) is provided, one of said valve closure bodies (92) being arranged in the air inlet chamber (72) and cooperating with the valve seat (76) on the side of the air inlet chamber, and the other valve closure body (94) being arranged in the third chamber (68) and cooperating with the valve seat (82) on the connecting body (78), whereby starting from a central position in which both valve passages are closed, always either communication between the air inlet chamber (72) and the third chamber (68) or between the third chamber (68) and the second chamber (66) and thus with atmosphere is established.

9. Pneumatic position controller as claimed in claim 8, characterized in that
   (a) two baffle plate supports (54,142) are provided on the housing portion (58) of the amplifier (24), the outlet nozzle (56) being located therebetween,
   (b) the baffle plate (52) rests on the baffle plate supports (54,142) and is held resiliently in engagement with the baffle plate supports (54,142) by a spring (144) resting centrally on the baffle plate (52), and
   (c) two dogs (146,148) are provided on the second arm of the two-armed lever (40), and are spaced and arranged on opposite sides of the baffle plate (52) and are adjustable relative to the baffle plate (52) whereby optionally one or the other dog (146,148) becomes effective and engages the baffle plate (52) with one or the other direction of rotation of the two-armed lever (40) and causes rotary movement of the baffle plate (52) against the action of the spring (144) about one or the other baffle plate support (54 or 142, respectively).

10. Pneumatic position controller as claimed in claim 8, characterized in that
   (a) a command pressure port (28), an output pressure port (150) and an air inlet port (70) are provided on that side of the housing (96), on which the movable wall member (30), the bearing assembly (98) and the amplifier (24) are arranged one above the other,
   (b) the housing (96) is raised-in on the opposite side on both sides of the helical torsion spring (50),
   (c) two manometers (156,158) are attached in the cavities (152,154) thus formed on the outside of the housing, the dials (160,162) of said manometers being arranged parallel to the plane of movement of the feedback lever (44) on opposite sides of the feedback lever (44),
   (d) a command pressure chamber (36) closed by the movable wall member (30) communicates through aligned bores (164,166) with the command pressure port (28), on one hand, and with one manometer (156), on the other hand, and
   (e) the third chamber (68) of the amplifier (24) communicates with the other manometer (158).

11. Pneumatic position controller as claimed in claim 10, characterized in that
   (a) the air inlet port (70) communicates, through a bore (170) aligned therewith, with the air inlet chamber (72),
   (b) this bore (170) is intersected by a transverse bore (172) which communicates with the first chamber (64) of the amplifier (24) through a narrow connecting bore (174),
   (c) an adjustable restrictor assembly is located in the transverse bore and includes the restrictor (86) between the air inlet port (70) and the first chamber (64).

12. In a pneumatic position controller for controlling the position of a pneumatic servomotor to a value determined by a pneumatic command pressure, including a movable wall member movable in response to the command pressure, a pneumatic amplifier having an output coupled to the servomotor, a balancing member responding to movement of the movable wall member for controlling the output of the pneumatic amplifier, and feedback means coupled between the servomotor and the balancing member for responding to the servomotor position to act on the balancing member and thereby control the pneumatic amplifier output, the improvement comprising:
   said feedback means including a feedback lever having a pivot axis for rotation about said pivot axis by said servomotor;
   said balancing member axially spaced from the feedback lever having a piovt axis substantially coaxially aligned with said feedback lever pivot axis; and
   a helical torsion spring having one end mounted to the balancing member and the other end mounted to the feedback lever to directly couple helical spring torque tension enabled during rotation of the feedback lever to the balancing member.

* * * * *